US012760852B2

(12) United States Patent
Attias

(10) Patent No.: US 12,760,852 B2
(45) Date of Patent: Oct. 13, 2026

(54) FLANGELESS RECESSED LIGHTING FIXTURE AND METHODS OF ADJUSTABLE INSTALLING THE SAME

(71) Applicant: Haim Attias, Los Angeles, CA (US)

(72) Inventor: Haim Attias, Los Angeles, CA (US)

(73) Assignee: Haim Attias, Los Angeles, CA (US)

( * ) Notice: Subject to any disclaimer, the term of this patent is extended or adjusted under 35 U.S.C. 154(b) by 0 days.

(21) Appl. No.: 19/245,439

(22) Filed: Jun. 23, 2025

(65) Prior Publication Data

US 2025/0389399 A1 Dec. 25, 2025

Related U.S. Application Data

(60) Provisional application No. 63/663,137, filed on Jun. 23, 2024.

(51) Int. Cl.
*F21S 8/02* (2006.01)
*F21V 21/04* (2006.01)
*F21V 21/14* (2006.01)

(52) U.S. Cl.
CPC ................ *F21S 8/02* (2013.01); *F21V 21/04* (2013.01); *F21V 21/14* (2013.01)

(58) Field of Classification Search
CPC .. F21S 8/02; F21S 8/026; F21V 21/04; F21V 21/14; F21V 21/048
See application file for complete search history.

(56) References Cited

U.S. PATENT DOCUMENTS

| | | | | |
|---|---|---|---|---|
| 11,454,382 | B1 * | 9/2022 | Wong | F21V 21/108 |
| 2006/0261235 | A1 * | 11/2006 | Rippel | F21V 21/04 248/343 |
| 2015/0233556 | A1 * | 8/2015 | Danesh | F21V 21/048 362/365 |
| 2019/0195475 | A1 * | 6/2019 | Jones | F21V 21/041 |
| 2025/0389399 | A1 * | 12/2025 | Attias | F21S 8/02 |
| 2026/0029110 | A1 * | 1/2026 | Moore | F21V 14/02 |

* cited by examiner

*Primary Examiner* — Christopher E Dunay
(74) *Attorney, Agent, or Firm* — Mark S. Cohen; PEARL COHEN LLP

(57) ABSTRACT

There is provided a flangeless recessed lighting fixture assembly that includes a pair of adjustable length brackets, a configurable elevating mechanism including operationally connectable to a recessed LED fixture and at least one elevating subassembly; the method of installing in a non-limiting manner includes: adjusting a length of the adjustable length brackets to a customized length, longitudinally translating the configurable elevating mechanism along the adjustable length brackets, adjusting a horizontal position of the static moiety along the adjustable length brackets; adjusting a vertical position of the dynamic moiety relative to the static moiety, by the elevating subassembly and leveling the dynamic moiety relative to the static moiety.

11 Claims, 5 Drawing Sheets

FLANGELESS RECESSED LIGHTING FIXTURE AND METHODS OF ADJUSTABLE INSTALLING THE SAME

TECHNICAL FIELD

In general, the present invention pertains to the art of construction and illumination. In particular, the invention relates to a flangeless recessed lighting fixture, having at least two different degrees of freedom in the installation and deployment thereof, as well as methods of adjustable installing and mounting the same.

BACKGROUND OF THE INVENTION

It is believed that the current state of the art is represented by the following patent literature: U.S. Pat. Nos. 6,123,438, 5,374,812, US2015143773, U.S. Pat. Nos. 8,100,565, 6,561,670, 8,854,796 and US20210364151.

U.S. Pat. No. 6,123,438 that is believed to represent the closest prior art discloses a lighting fixture having an insulation shield mounted thereto for maintaining surrounding insulation a desired spacing from at least portions of the fixture to increase permissible lamp wattages in an insulation contact application, the shield is preferably formed of a polymeric material molded with openings to permit access to portions of the fixture such as a junction box. The insulation shield is particularly useful with downlighting fixtures installable immediately above ceiling openings, such fixtures typically being mounted to structural joists or to suspended ceilings, and especially downlighting fixtures where lighting performance is to be improved through use of higher wattage lamping. The insulation shield acts to provide a desired volume of air around the fixture in order to more effectively dissipate heat generated by the higher wattage lamping.

SUMMARY OF THE INVENTION

The following summary of the invention is provided to exhibit the basic understanding of some principles, underlying various aspects and features of the invention. This summary is not an extensive overview of the invention and as such it is not necessarily intended to particularly identify all key or critical elements of the invention and is not to delineate the scope of the invention. Its sole purpose is to present some concepts of the invention in a simplified form as a prelude to the following more detailed.

The invention was made in view of the deficiencies of the prior art and provides systems, methods and processes for overcoming these deficiencies. According to some embodiments and aspects of the present invention, there is provided a flangeless recessed lighting fixture comprising: a recessed lighting fixture; a pair of adjustable length brackets comprising an elongated shaft and mounting plates at each terminal portion thereof; an elevating mechanism comprising a static moiety, a dynamic moiety and an elevating subassembly, and a covering mounting plate.

In accordance with some embodiments and aspects of the present invention, there is provided a method of installing of an adjustable flangeless recessed lighting fixture in a non-limiting manner including: lateral adjustment of the length of the shaft of each one of adjustable length brackets of the flangeless recessed lighting fixture, thereby extending mounting plates at each terminal portion of the brackets, so as to adjustably position the opposing mounting plates, typically adjacently to horizontal paralleling constructional support members or beams; lateral adjustment of the location of the configurable elevating mechanism along the shaft of the brackets of the flangeless recessed fixture, and axial adjustment of the leveling of the recessed lighting fixture along the longitudinal axis of the configurable elevating mechanism.

In accordance with some embodiments and aspects of the present invention, there is provided a flangeless recessed lighting fixture assembly that includes: a lighting element; a recessed LED fixture configured for accommodating the lighting element, including a bottom opening on a bottom face thereof and a top opening on top face thereof; an encasement configured for covering and enclosing the recessed LED fixture; a pair of adjustable length brackets operationally connectable to the recessed LED fixture; mounting plates at terminal portions of the of adjustable length brackets, configured for mounting onto constructional elements of a building; a configurable elevating mechanism including: a static moiety, operationally connectable to the adjustable length brackets, a dynamic moiety operationally connectable to the recessed LED fixture and forming a slidable arrangement with the static moiety, and at least one elevating subassembly, operationally connecting the dynamic moiety relative to the static moiety; in which the adjustable length brackets are configured for adjustably extend between opposing constructional elements of a building, thereby facilitating a first degree of freedom in adjustment of flangeless recessed lighting fixture assembly, by adjusting the adjustable length brackets to a customized length; in which the static moiety of the configurable elevating mechanism is longitudinally translatable along the adjustable length brackets, thereby facilitating a second degree of freedom of the flangeless recessed lighting fixture assembly, by adjusting a horizontal position of the static moiety along the adjustable length brackets; in which the at least one elevating subassembly is configured for adjusting a position of the dynamic moiety relative to the static moiety, thereby facilitating a third degree of freedom of the flangeless recessed lighting fixture assembly, by vertically leveling the dynamic moiety along a longitudinal axis of the elevating subassembly.

In some embodiments, the adjustable length brackets comprise at least one telescopic adjustable shaft.

In some embodiments, the encasement is secured to the recessed LED fixture by an interconnecting part.

In some embodiments, the static moiety further includes an orthogonally protruding plate, whereas the dynamic moiety further includes an orthogonally protruding plate, configured to be operationally connected to the orthogonally protruding plate of the static moiety by the elevating subassembly of the configurable elevating mechanism.

In some embodiments, the static moiety and/or the dynamic moiety further includes lateral extensions protruding laterally outwards from side faces thereof.

In some embodiments, the static moiety and/or the dynamic moiety further includes lateral grooves, extending along lateral edges thereof.

In some embodiments, the grooves are formed by a centrical plate and two right-angled profiles.

In some embodiments, the elevating subassembly of the configurable elevating mechanism includes a headbolt terminating with a cup, rotatably screw-threaded into an aperture in the static moiety or the dynamic moiety.

In some embodiments, the elevating subassembly of the configurable elevating mechanism further includes a biasing means configured for driving the dynamic moiety away from the static moiety.

In some embodiments, the configurable elevating mechanism is configured to prevent rotation of the dynamic moiety relative to the static moiety.

In some embodiments, the configurable elevating mechanism is configured to prevent any movement of the dynamic moiety relative to the static moiety other than the adjusting of the position of the dynamic moiety relative to the static moiety along the longitudinal axis of the elevating subassembly.

In some embodiments, the flangeless recessed lighting fixture assembly further includes a covering mounting plate, operationally connected to a bottom face of the dynamic moiety.

In accordance with some embodiments and aspects of the present invention, there is provided a method of installing an adjustable flangeless recessed lighting fixture that includes: providing a flangeless recessed lighting fixture assembly including: a lighting element; a recessed LED fixture configured for accommodating the lighting element, including a bottom opening on a bottom face thereof and a top opening on top face thereof; an encasement configured for covering and enclosing the recessed LED fixture; a pair of adjustable length brackets operationally connectable to the recessed LED fixture; mounting plates at terminal portions of the of adjustable length brackets, configured for mounting onto constructional elements of a building; a configurable elevating mechanism including: a static moiety, operationally connectable to the adjustable length brackets, and a dynamic moiety operationally connectable to the recessed LED fixture and forming a slidable arrangement with the static moiety, and at least one elevating subassembly, operationally connecting the dynamic moiety relative to the static moiety; adjusting a length of the adjustable length brackets to a customized length; extending the adjustable length brackets between opposing constructional elements of a building; affixing the mounting plates to the constructional elements of the building, thereby mounting the adjustable length brackets.

In some embodiments, the method further includes longitudinally translating the static moiety of the configurable elevating mechanism along the adjustable length brackets and adjusting a horizontal position of the static moiety along the adjustable length brackets;

In some embodiments, the method further includes adjusting a vertical position of the dynamic moiety relative to the static moiety, by the elevating subassembly and leveling the dynamic moiety relative to the static moiety.

In some embodiments, the method further includes driving the dynamic moiety away from the static moiety.

In some embodiments, the method further includes preventing rotation of the dynamic moiety relative to the static moiety.

In some embodiments, the method further includes preventing any movement of the dynamic moiety relative to the static moiety other than the adjusting of the position of the dynamic moiety relative to the static moiety along the longitudinal axis of the elevating subassembly.

In accordance with some embodiments and aspects of the present invention, there is provided a method of installing an adjustable flangeless recessed lighting fixture that includes: providing a flangeless recessed lighting fixture assembly including: a pair of adjustable length brackets operationally connectable to mounting plates at terminal portions of the of adjustable length brackets; a configurable elevating mechanism, operationally connected to the adjustable length brackets, and a recessed LED fixture, operationally connected to the configurable elevating mechanism; adjusting a length of the adjustable length brackets to a customized length; extending the adjustable length brackets between opposing constructional elements of a building; affixing the mounting plates to the constructional elements of the building, thereby mounting the adjustable length brackets; longitudinally translating the configurable elevating mechanism along the adjustable length brackets; adjusting a horizontal position of the configurable elevating mechanism along the adjustable length brackets; adjusting a vertical position of the recessed LED fixture by the elevating mechanism; leveling the recessed LED fixture relative to the adjustable length brackets.

DEFINITIONS

The term matching or a term similar thereto, as referred to herein, is to be construed as having a cross-sectional area and/or shape of a component equal or essentially similar to a cross-sectional area and/or shape of another component. It should be acknowledged that the components may only to be similar in the cross-sectional areas and/or shapes, to satisfy the term matching or similar, so long as the cross-sectional areas of the components can be mated and/or inserted into each other and/or the combination thereof essentially fits together and/or occupy essentially the same space.

The term structured, as referred to herein, is to be construed as including any geometrical shape, exceeding in complexity a plain linear shape or a shape embodying a simple and/or standardized circular, elliptical or polygonal contour or profile. Any more complex shape than a plain linear shape or a shape embodying a simple and/or standardized circular, elliptical or polygonal contour or profile, constitutes an example of structured geometry.

The term modular, as referred to herein, should be construed as a including a stand-alone and/or autonomically functioning of structured unit. The term modular inter alia means a standardized unit that may be conveniently installed or deployed without significant impact to the environment. The term modular, however, doesn't necessarily mean providing for ease of interchange or replacement. The term modular is optionally satisfied solely by providing for ease of onetime deployment or installation.

The term readily connectable, as referred to herein, should be construed as including any structure and/or member that is configured to be conveniently connected to other structure and/or member and/or components of a larger system or assembly. The term readily connectable, however, doesn't necessarily mean readily disconnectable or removable. The term readily connectable is optionally satisfied by providing for ease of onetime connection or coupling.

The term biasing means or alike, as referred to herein, should be construed as including any material, structure or mechanism, configured to accumulate mechanical energy, by changing the configuration thereof, upon a force exerted thereon, such as a compressive, tensile, shear or torsional force, as well as for releasing the energy accumulated therein, by returning to the normal or default configuration thereof and thereby performing a mechanical work, typically by linear or radial displacement. Examples of biasing means in a non-limiting manner include, springs, elastomers, leaf-springs, coil-springs, tension/extension spring, compression spring torsion spring, constant spring, variable spring, variable stiffness spring, flat spring, machined spring, serpentine spring, garter spring, cantilever spring, helical spring, hollow tubing springs, volute spring, V-spring, belleville washer or belleville spring, constant-force spring, gas spring, mainspring, negator spring, progressive rate coil springs, rubber band, spring washer and wave spring.

By operationally connected and operably coupled or similar terms used herein is meant connected in a specific way (e.g., in a manner allowing fluid to move and/or electric power or signal to be transmitted) that allows the disclosed system and its various components to operate effectively in the manner described herein.

The term light emitting device or the abbreviation LED, as referred to herein, are to be construed as any a device or component configured to illuminate, inter alia at least a constituent portion of a luminescent pattern. LEDs may include, but are not limited to devices such as light emitting diodes, incandescent light bulbs, halogen lamps, gas-discharge lamps and fluorescent lamps, neon lamps and any metal-vapor lamp, as well as illuminating components used in backlit displays. LEDs may include multicolor LEDs to enhance the variety of patterns and imagery conveyed through the luminescent patterns.

The terms method and process as used herein are to be construed as including any sequence of steps or constituent actions, regardless a specific timeline for the performance thereof. The particular steps or constituent actions of any given method or process are not necessarily in the order they are presented in the claims, description or flowcharts in the drawings, unless the context clearly dictates otherwise. Any particular step or constituent action included in a given method or process may precede or follow any other particular step or constituent action in such method or process, unless the context clearly dictates otherwise. Any particular step or constituent action and/or a combination thereof in any method or process may be performed iteratively, before or after any other particular step or action in such method or process, unless the context clearly dictates otherwise. Moreover, some steps or constituent actions and/or a combination thereof may be combined, performed together, performed concomitantly and/or simultaneously and/or in parallel, unless the context clearly dictates otherwise. Moreover, some steps or constituent actions and/or a combination thereof in any given method or process may be skipped, omitted, spared and/or opted out, unless the context clearly dictates otherwise.

In the specification or claims herein, any term signifying an action or operation, such as: a verb, whether in base form or any tense, gerund or present/past participle, is not to be construed as necessarily to be actually performed but rather in a constructive manner, namely as to be performed merely optionally or potentially.

The term substantially as used herein is a broad term, and is to be given its ordinary and customary meaning to a person of ordinary skill in the art (and is not to be limited to a special or customized meaning), and refers without limitation to being largely but not necessarily entirely of that quantity or quality which is specified.

The term essentially means that the composition, method or structure may include additional ingredients, stages and or parts, but only if the additional ingredients, the stages and/or the parts do not materially alter the basic and new characteristics of the composition, method or structure claimed.

As used herein, the term essentially changes a specific meaning, meaning an interval of plus or minus ten percent (±10%). For any embodiments disclosed herein, any disclosure of a particular value, in some alternative embodiments, is to be understood as disclosing an interval approximately or about equal to that particular value (i.e., ±10%).

As used herein, the terms about or approximately modify a particular value, by referring to a range equal to the particular value, plus or minus twenty percent (+/−20%). For any of the embodiments, disclosed herein, any disclosure of a particular value, can, in various alternate embodiments, also be understood as a disclosure of a range equal to about that particular value (i.e. +/−20%).

As used herein, the term or is an inclusive or operator, equivalent to the term and/or, unless the context clearly dictates otherwise; whereas the term and as used herein is also the alternative operator equivalent to the term and/or, unless the context clearly dictates otherwise.

It should be understood, however, that neither the briefly synopsized summary nor particular definitions hereinabove are not to limit interpretation of the invention to the specific forms and examples but rather on the contrary are to cover all modifications, equivalents and alternatives falling within the scope of the invention.

BRIEF DESCRIPTION OF THE DRAWINGS

The present invention will be understood and appreciated more comprehensively from the following detailed description taken in conjunction with the appended drawings in which.

Figure 1:
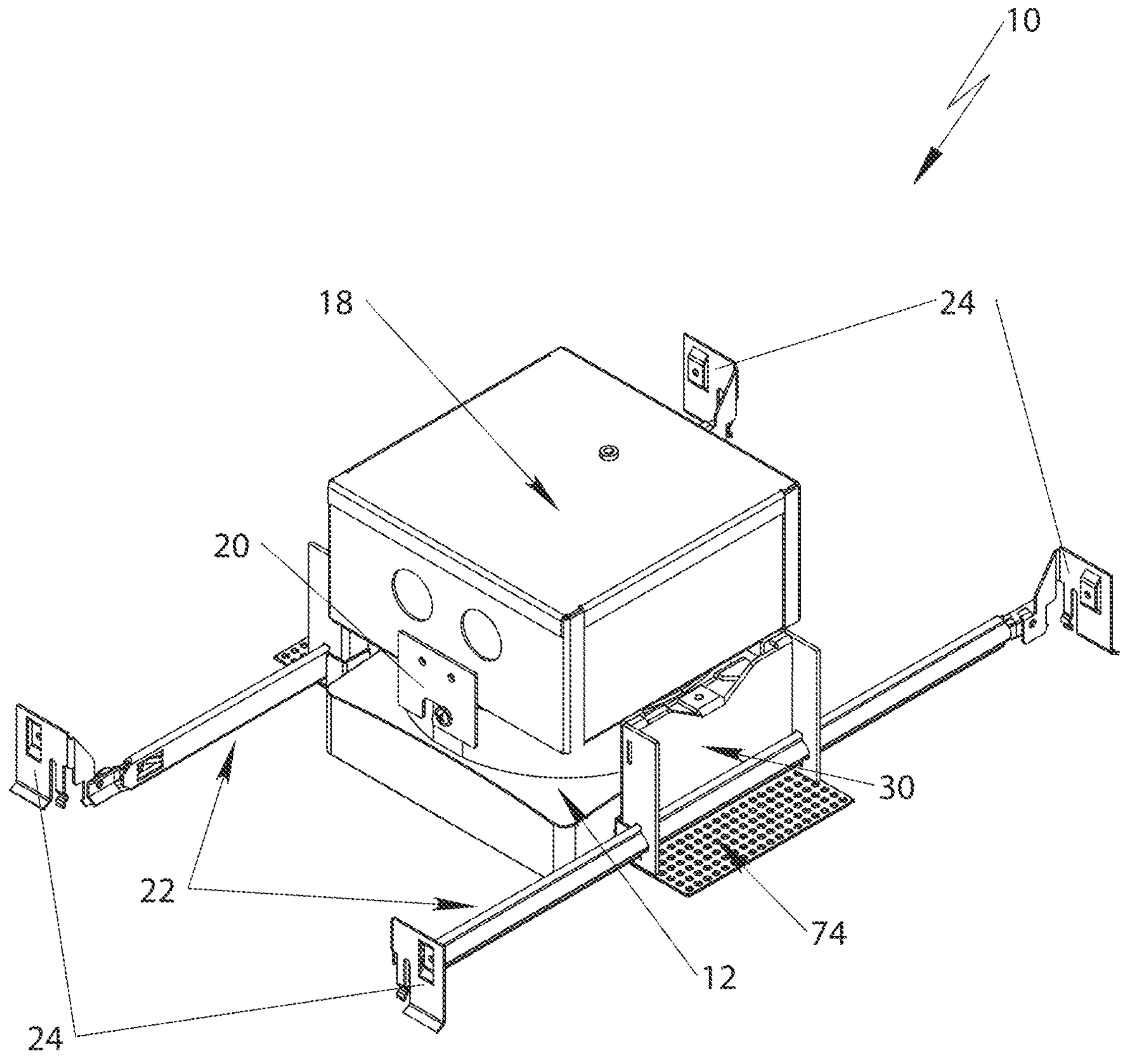
FIG. 1 is a perspective view of a flangeless recessed lighting fixture, according to some embodiments of the present invention.
Figure 2:
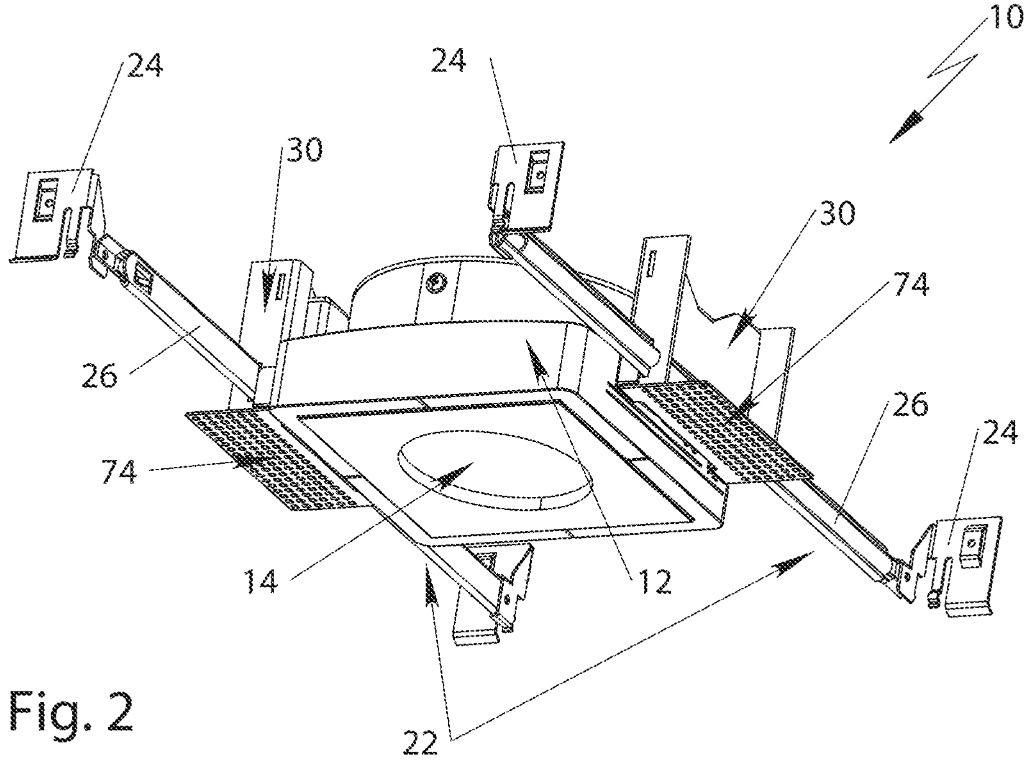
FIG. 2 is a perspective bottom view of a flangeless recessed lighting fixture, showing a lighting element, according to some embodiments of the present invention.
Figure 3:
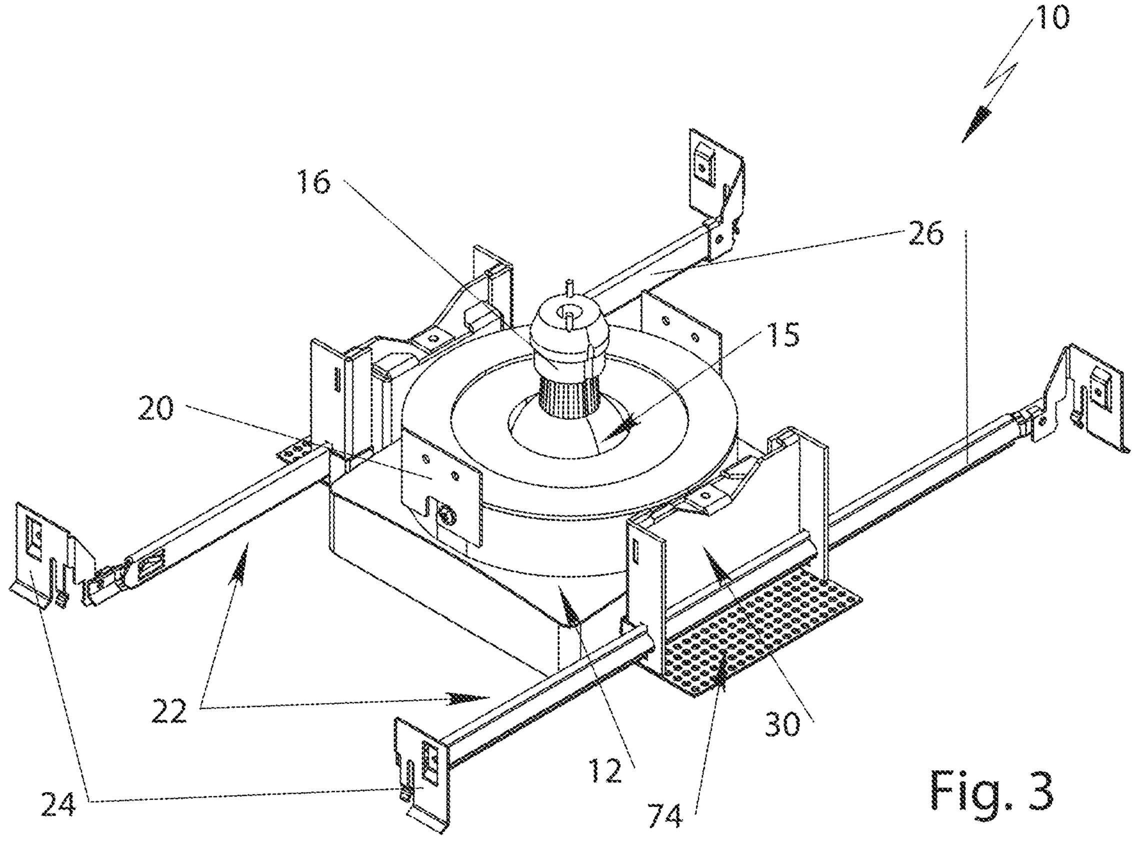
FIG. 3 is a top perspective view of a flangeless recessed lighting fixture, showing the lighting element, according to some embodiments of the present invention.
Figure 4A:
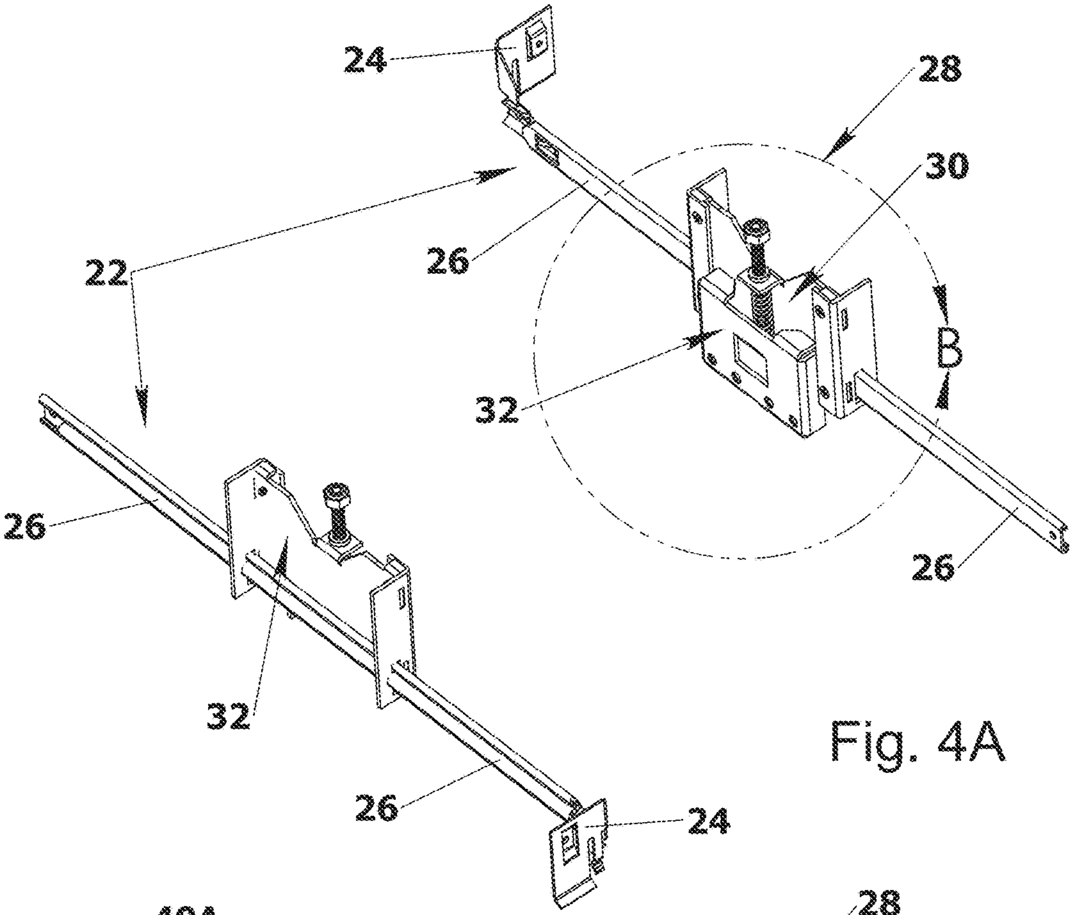
FIG. 4A is a top perspective view of a pair of adjustable length brackets including a configurable elevating mechanism, according to some embodiments of the present invention.
Figure 4B:
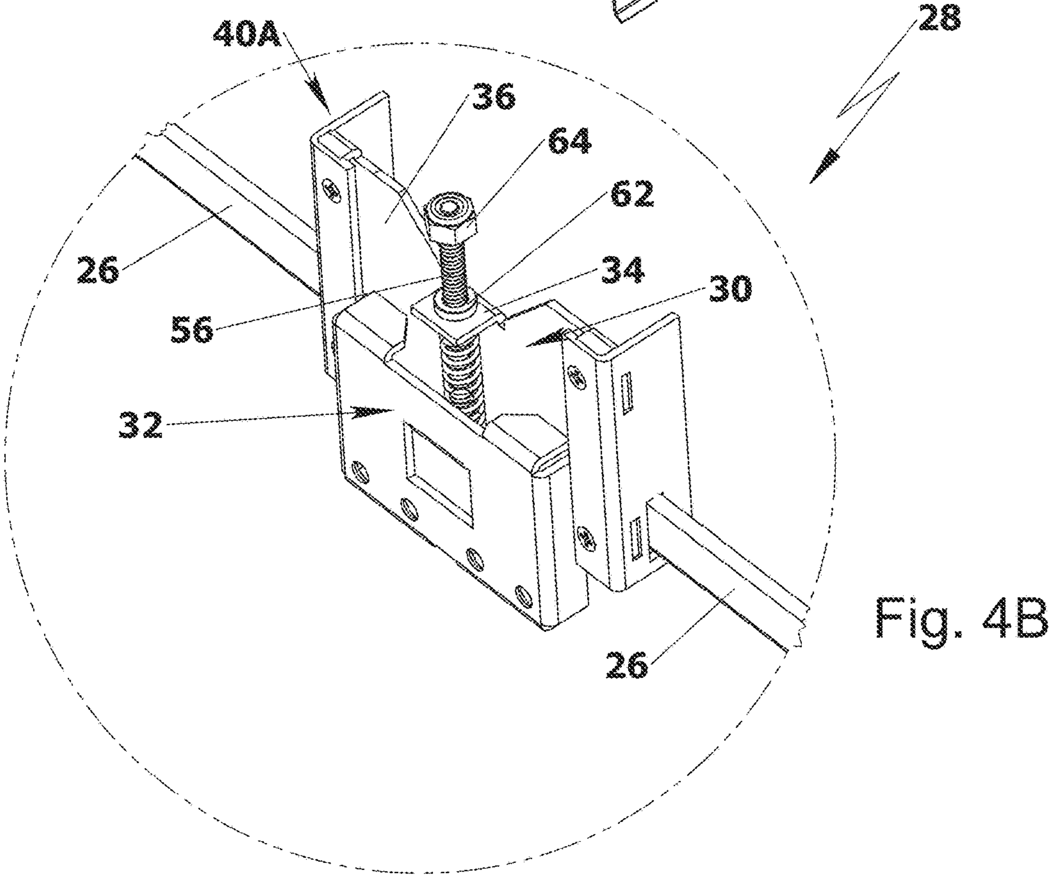
FIG. 4B is an enlarged view of the configurable elevating mechanism, according to some embodiments of the present invention.
Figure 5A:
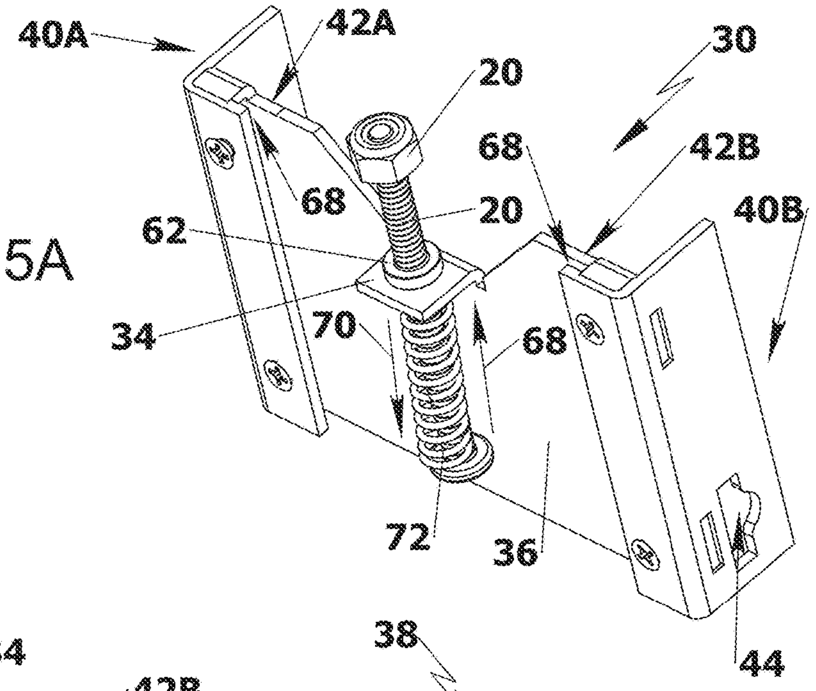
FIG. 5A is a perspective view of a static moiety of the configurable elevating mechanism including an elevating subassembly, according to some embodiments of the present invention.
Figure 5B:
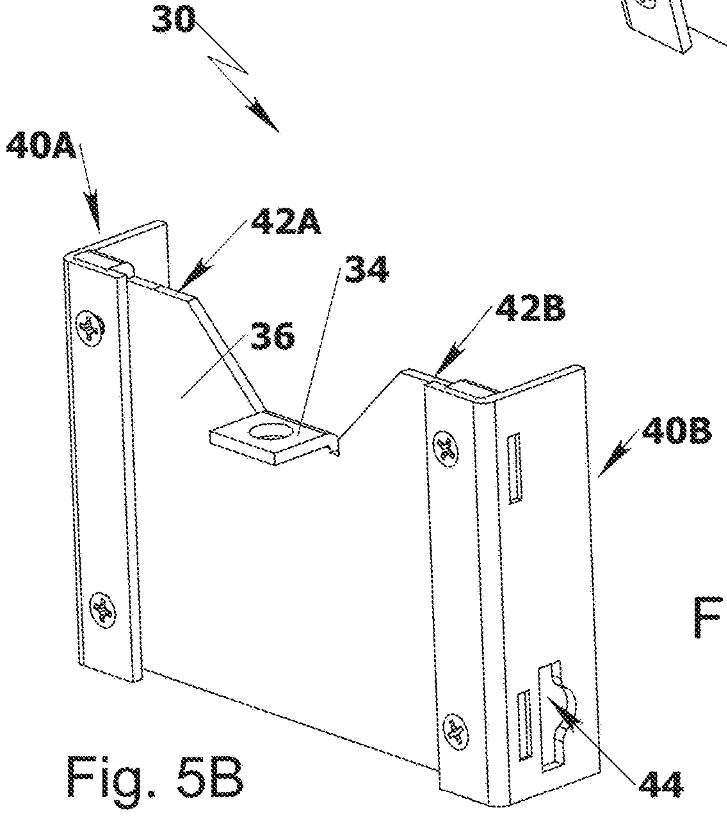
FIG. 5B is another perspective view of a static moiety of the configurable elevating mechanism, without an elevating subassembly, according to some embodiments of the present invention.
Figure 5C:
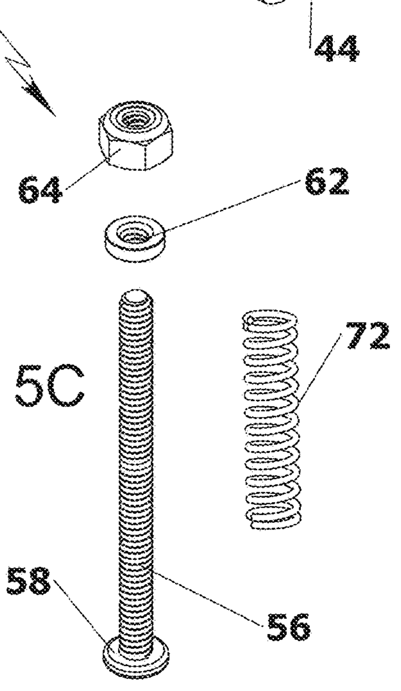
FIG. 5C is an exploded isometric view of the elevating subassembly of the configurable elevating mechanism, according to some embodiments of the present invention.
Figure 5D:
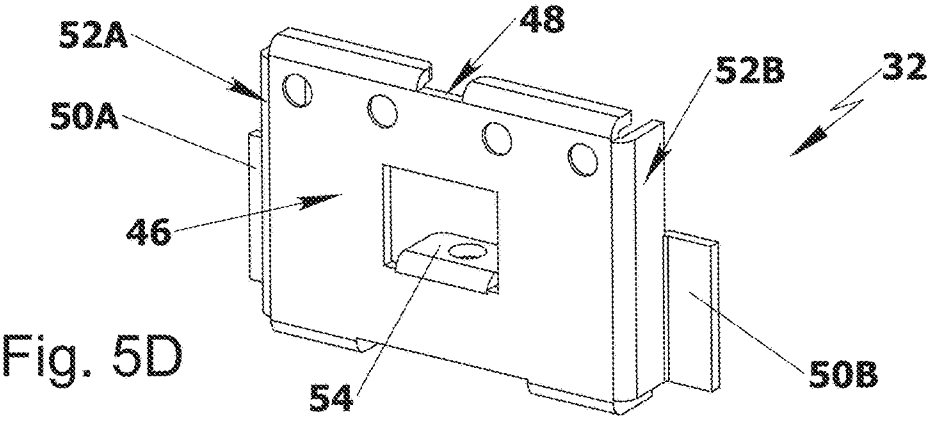
FIG. 5D is a perspective view of a dynamic moiety of the configurable elevating mechanism, according to some embodiments of the present invention.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF THE INVENTION

Illustrative embodiments of the invention are described below. In the interest of clarity, not all features of actual implementation are described in this specification. It should be appreciated that various features or elements described in the context of some embodiment may be interchangeable with features or elements of any other embodiment described in the specification. Moreover, it will be appreciated that for the development of any actual embodiment, numerous implementation-specific decisions must be made to achieve the developers' specific goals, such as compliance with technology- or business-related constraints, which may vary from one implementation to another, and the effort of such a development might be complex and time-consuming, but would nevertheless be a routine undertaking for those of ordinary skill in the art having the benefit of this disclosure.

In accordance with some embodiments of the present invention, reference is now made to FIGS. 1 to 5D, showing flangeless recessed lighting fixture assembly 10. In some embodiments, flangeless recessed lighting fixture assembly 10 comprises recessed LED fixture 12. Recessed LED fixture 12 is configured for illuminating downwardly from a ceiling, as well as at least partially sidewise from vertical walls and/or inclined surfaces. In some examples, recessed LED fixture 12 in a non-limiting manner embodies a round, square or rectangular shape. In some embodiments, recessed LED fixture 12 defines bottom opening 14 on its bottom face and top opening 15 on its top face, configured for accommodating lighting element 16.

In some examples, recessed LED fixture 12 embodies a variety of shapes, matching different types and of light elements and/or lamps and/or LEDs. In some examples, lighting element 16 accommodated within recessed LED fixture 12 comprises a reflector having an incandescent lamp and/or high intensity discharge lamp and/or fluorescent lighting elements and/or any other type of LED.

In some embodiments, flangeless recessed LED fixture 10 further comprises encasement 18. Encasement 18 is configured for covering and enclosing recessed LED fixture 12. Encasement 18 is secured to recessed LED fixture by interconnecting part 20. In some examples, interconnecting part 20 in a non-limiting manner include: a screw, bolt and nut, extended parallel coupler, fixing clamper, loop, chain, orthogonal slot, etc. In some preferred examples, interconnecting part 20 is configured for being readily connectable and/or affixable to LED fixture 12, by firstly inserting the stem of a bolt affixed to LED fixture 12 into a vertical portion of the orthogonal slot in interconnecting part 20 so that the cap of the bolt protrudes beyond in interconnecting part 20 and then by laterally translating the stem of the bolt affixed to LED fixture 12 within a horizontal portion of the orthogonal slot of interconnecting part 20.

In some embodiments, flangeless recessed LED fixture 10 further comprises a pair of adjustable length brackets 22. Adjustable length brackets 22 are operationally connectable to recessed LED fixture 12. In some embodiments, adjustable length brackets 22 comprise mounting plates 24 at terminal portions thereof. Mounting plates 24 of each one of the terminal portions of adjustable length brackets 22 are typically configured for mounting and/or deployment, typically onto paralleling constructional support members or beams.

In some examples, paralleling constructional support members or beams are joists and/or suspended ceiling T-shaped grids and/or steel framing and/or wood framing. In some examples, paralleling constructional support members or beams are horizontal, vertical, angled or inclined. In some examples, mounting plates 24 comprise an attachment element, such as a screw threading, bolt and nut, adhesive, nail, etc. The attachment element is typically configured for securing adjustable length brackets 22, typically onto paralleling constructional support members or beams.

In some embodiments, each one of adjustable length brackets 22 further comprises at least one shaft 26. In some embodiments, at least at one end of shaft 26 is connected mounting plate 24. In some embodiments, shaft 26 of each one of adjustable length brackets 22 is a telescopic and laterally adjustable shaft, thereby adjustably extended to engage opposing paralleling constructional support members or beams by each mounting plate 24, thereby facilitating flangeless recessed lighting fixture assembly 10 with a first degree of freedom in adjustment of the lengths of shafts 26 of adjustable length brackets 22.

In some embodiments, flangeless recessed LED fixture 10 further comprises configurable elevating mechanism 28. In some embodiments, configurable elevating mechanism 28 comprises static moiety 30 and dynamic moiety 32. Static moiety 30 is operationally connectable to shaft 26 of each one of adjustable length brackets 22, thereby facilitating a second degree of freedom of flangeless recessed lighting fixture assembly 10, in the movement and horizontal adjustment of the position along the length of shaft 26 of adjustable length brackets 22.

In some embodiments, static moiety 30 further comprises flanking members 40A and 40B on lateral sides 42A and 42B thereof. Each one of flanking members 40A and 40B typically comprise side-apertures 44. Side-apertures 44 are configured for accommodating shaft 26, thereby allowing elevating mechanism 28 and consequently recessed LED fixture 12 to be connectable and horizontally translatable along the centerline of elevating subassembly 38.

In some embodiments, static moiety 30 further comprises static orthogonally protruding plate 34. Static orthogonally protruding plate 34 extends forwardly from front face 36 of static moiety 30. Static orthogonally protruding plate 34 is configured to be attachable to dynamic moiety 32 by a means of elevating subassembly 38 of configurable elevating mechanism 28.

In some embodiments, configurable elevating mechanism 28 comprises dynamic moiety 32. Dynamic moiety 30 is operationally connectable to static moiety 32. Dynamic moiety 30 is typically further connectable to recessed LED fixture 12, thereby facilitating a third degree of freedom of flangeless recessed lighting fixture assembly 10, in the movement of leveling adjustment along the longitudinal axis of elevating subassembly 38. Dynamic moiety 32 typically further comprises frontal face 46 and rear face 48. Dynamic moiety 32 typically further includes lateral extensions 50A and 50B protruding laterally outwards from side faces 52A and 52B of dynamic moiety 32.

In some embodiments, dynamic moiety 32 further comprises dynamic orthogonally protruding plate 54. Dynamic orthogonally protruding plate 54 extends rearwardly from rear face 48 of dynamic moiety 32. Dynamic orthogonally protruding plate 54 is configured to be attachable to static moiety 30 by elevating subassembly 38 of configurable elevating mechanism 28.

In some embodiments, elevating subassembly 38 of configurable elevating mechanism 28 is configured for operationally connecting static orthogonally protruding plate 34 of static moiety 30 to dynamic orthogonally protruding plate

54 of dynamic moiety 32. In some embodiments, elevating subassembly 38 comprises headbolt 56 terminating with cup 58. Headbolt 56 is rotatably screw-threaded into an aperture in dynamic orthogonally protruding plate 54 of static moiety 30, so that cup 58 underneath dynamic orthogonally protruding plate 54 of dynamic moiety 32.

In some embodiments, elevating subassembly 38 of configurable elevating mechanism 28 comprises driven nut 62. Driven nut 62 securely fastens elevating subassembly 38 to static orthogonally protruding plate 34 of static moiety 30. In some embodiments, elevating subassembly 38 of configurable elevating mechanism 28 comprises terminal securing nut 64. Terminal securing nut 64 is configured for stopping driven nut 62 when the latter rises to the top end of headbolt 56, thereby preventing dynamic moiety 32 from been dismantled from static moiety 30.

In some embodiments, elevating subassembly 38 of configurable elevating mechanism 28 further comprises biasing means 72. Biasing means 72 is accommodated along headbolt 56, between cup 58 of headbolt 56 and static orthogonally protruding plate 34 of static moiety 30. In some examples, biasing means 72 in a non-limiting manner include, springs, elastomers, leaf-springs, coil-springs, tension/extension spring, compression spring torsion spring, constant spring, variable spring, variable stiffness spring, flat spring, machined spring, serpentine spring, garter spring, cantilever spring, helical spring, hollow tubing springs, volute spring, V-spring, belleville washer or belleville spring, constant-force spring, gas spring, mainspring, negator spring, progressive rate coil springs, rubber band, spring washer and wave spring.

In some embodiments, headbolt 56 is screw threaded to elevate dynamic moiety 32 in the direction of arrow 69 along the axis of elevating subassembly 38, whereby biasing means 72 is compressed and thus increases the force driving dynamic moiety 32 away from static moiety 30. In some embodiments, headbolt 56 is screwed in an opposite direction to lower in dynamic moiety 32 the direction of arrow 70 along the axis of elevating subassembly 38, whereby biasing means 72 is decompressed and thus decreases the force driving dynamic moiety 32 away from static moiety 30.

In some preferred embodiments, configurable elevating mechanism 28 preventing rotation and any other movement of dynamic moiety 32 except along the longitudinal axis of headbolt 56. In some examples, configurable elevating mechanism 28 comprises grooves 68 formed on static moiety 30 and lateral extensions 50A and 50B on dynamic moiety 32 inserted into grooves 68. Lateral extensions 50A and 50B protruding from side faces 52A and 52B of dynamic moiety 32 interlock into groove 68 on lateral sides 42A and 42B of static moiety 30, thereby preventing rotation of dynamic moiety 32 and effectively limiting the movement of dynamic moiety 32 only to axial translation along the centerline of elevating subassembly 38.

In some other examples, grooves 68 are formed on static moiety 30 by a centrical plate and two right-angled profiles 40A and 40B. Static moiety 30 comprising centrical plate and two right-angled profiles 40A and 40B on the lateral sides thereof forms grooves 68 on front face 36 of static moiety 30, so that lateral extensions 50A and 50B protruding from side faces 52A and 52B of dynamic moiety 32 are introducible into grooves 68 and contiguously translatable therein.

In some embodiments, flangeless recessed LED fixture 10 further comprises covering mounting plate 74. Covering mounting plate 74 is operationally connected to the bottom face of dynamic moiety 32. Covering mounting plate 74 typically comprises a plurality of apertures, through which various fixation elements are insertable, to secure a ceiling cover (not shown) underneath the bottom face of covering mounting plate 74, thereby covering flangeless recessed LED fixture 10 except of the interior volume of recessed LED fixture 12. In some preferred embodiments, covering mounting plate 74 is configured to secure a gypsum trim ceiling cover.

Figure 6:
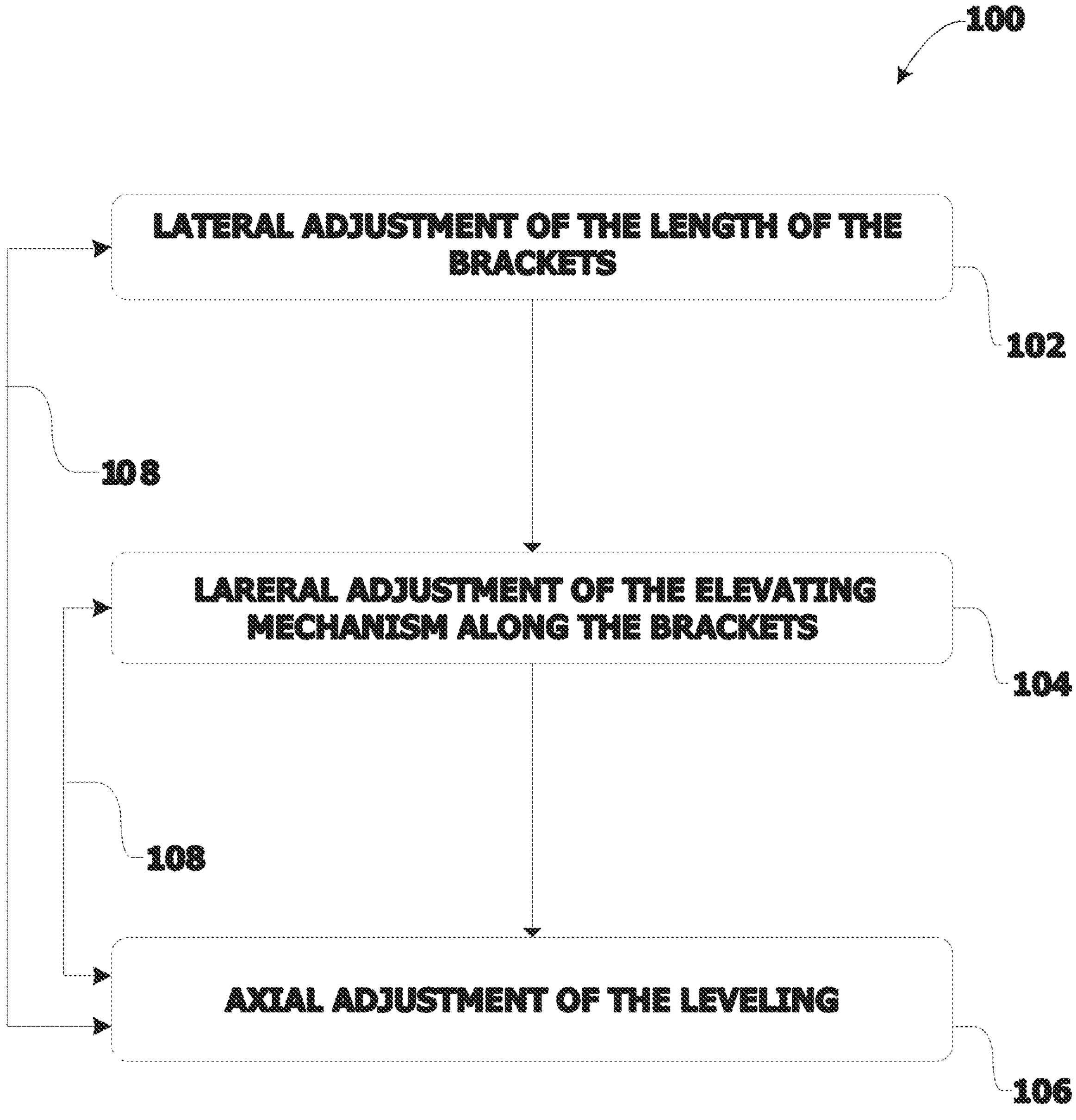
FIG. 6 is flowchart of a method of adjustable installing of a flangeless recessed lighting fixture, according to some embodiments of the present invention.

In accordance with some embodiments of the present invention, reference is now made to FIG. 6, showing a flowchart of method 100 of adjustably installing flangeless recessed LED fixture. The method of the embodiment of FIG. 6 illustrates various features that may be interchangeable with elements and/or features of any other embodiment described in the specification.

In some embodiments, method 100 comprises step 102 of lateral adjustment of the length of the shaft of each one of adjustable length brackets of the flangeless recessed LED fixture, thereby extending the shafts of the adjustable length brackets, so as to urge and/or engage and/or affix the plates at the ends of adjustable length brackets, to paralleling constructional support members or beams. In some embodiments, method 100 further comprises step 104 of lateral adjustment of the location of the configurable elevating mechanism on the shaft of the adjustable length brackets of the flangeless recessed LED fixture.

In some embodiments, method 100 further includes step 106 of vertical adjustment of the leveling of the recessed LED fixture along the longitudinal axis of the configurable elevating mechanism. Step of 106 of vertical adjustment is achievable by manipulating the elevating subassembly, thereby driving the recessed LED fixture to move up and down along the longitudinal axis of the configurable elevating mechanism.

In some preferred embodiments, method 100 comprises step 108 including step 102 of lateral adjustment of the length of the adjustable length brackets combined with step 106 of vertical adjustment of the leveling of the recessed LED fixture along the longitudinal axis of the configurable elevating mechanism.

In other preferred embodiments, method 100 comprises step 108 including step 104 of lateral adjustment of the location of the configurable elevating mechanism on the shafts of the adjustable length brackets combined with step 106 of axial adjustment the leveling of the recessed LED fixture along the longitudinal axis of the configurable elevating mechanism.

It will be appreciated by persons skilled in the art of the invention that various features and/or elements elaborated in the context of a specific embodiment described hereinabove and/or referenced herein and/or illustrated by a particular example in a certain drawing enclosed hereto, whether method, system, device or product, is/are interchangeable with features and/or elements of any other embodiment described in the specification and/or shown in the drawings. Moreover, skilled persons would appreciate that the present invention is not limited by what has been particularly shown and described hereinabove. Rather the scope of the invention is defined by the claims which follow:

The invention claimed is:

1. A flangeless recessed lighting fixture assembly comprises:

a. a lighting element;

b. a recessed LED fixture configured for accommodating said lighting element, comprising a bottom opening on a bottom face thereof and a top opening on top face thereof;

c. an encasement configured for covering and enclosing said recessed LED fixture;

d. a pair of adjustable length brackets operationally connectable to said recessed LED fixture;

e. mounting plates at terminal portions of said of adjustable length brackets, configured for mounting onto constructional elements of a building;

f. a configurable elevating mechanism comprising:

i. a static moiety, operationally connectable to said adjustable length brackets, and ii. a dynamic moiety operationally connectable to said recessed LED fixture and forming a slidable arrangement with said static moiety, and iii. at least one elevating subassembly, operationally connecting said dynamic moiety to said static moiety;

wherein said adjustable length brackets are configured for adjustably extend between opposing constructional elements of a building, thereby facilitating a first degree of freedom in adjustment of flangeless recessed lighting fixture assembly, by adjusting said adjustable length brackets to a customized length;

wherein said static moiety of said configurable elevating mechanism is longitudinally translatable along said adjustable length brackets, thereby facilitating a second degree of freedom of said flangeless recessed lighting fixture assembly, by adjusting a horizontal position of said static moiety along said adjustable length brackets;

wherein said at least one elevating subassembly is configured for adjusting a position of said dynamic moiety relative to said static moiety, thereby facilitating a third degree of freedom of said flangeless recessed lighting fixture assembly, by vertically leveling said dynamic moiety along a longitudinal axis of said elevating subassembly;

wherein said elevating subassembly of said configurable elevating mechanism comprises a headbolt terminating with a cup, rotatably screw-threaded into an aperture in at least one member, selected from the group consisting of:

said static moiety and said dynamic moiety.

2. The flangeless recessed lighting fixture assembly as in claim 1, wherein said adjustable length brackets comprise at least one telescopic adjustable shaft.

3. The flangeless recessed lighting fixture assembly as in claim 1, wherein said encasement is secured to said recessed LED fixture by an interconnecting part.

4. The flangeless recessed lighting fixture assembly as in claim 1, wherein said static moiety further comprises an orthogonally protruding plate, whereas said dynamic moiety further comprises an orthogonally protruding plate, configured to be operationally connected to said orthogonally protruding plate of said static moiety by said elevating subassembly of said configurable elevating mechanism.

5. The flangeless recessed lighting fixture assembly as in claim 1, wherein at least one member, selected from the group consisting of: said static moiety and said dynamic moiety, further comprises lateral extensions protruding laterally outwards from side faces thereof.

6. The flangeless recessed lighting fixture assembly as in claim 1, wherein at least one member, selected from the group consisting of: said static moiety and said dynamic moiety, further comprises lateral grooves, extending along lateral edges thereof.

7. The flangeless recessed lighting fixture assembly as in claim 6, wherein said grooves are formed by a centrical plate and two right-angled profiles.

8. The flangeless recessed lighting fixture assembly as in claim 1, wherein said elevating subassembly of said configurable elevating mechanism further comprises a biasing means configured for driving said dynamic moiety away from said static moiety.

9. The flangeless recessed lighting fixture assembly as in claim 1, wherein said configurable elevating mechanism is configured to prevent rotation of said dynamic moiety relative to said static moiety.

10. The flangeless recessed lighting fixture assembly as in claim 1, wherein said configurable elevating mechanism is configured to prevent any movement of said dynamic moiety relative to said static moiety other than said adjusting of said position of said dynamic moiety relative to said static moiety along said longitudinal axis of said elevating subassembly.

11. The flangeless recessed lighting fixture assembly, as in claim 1, further comprises a covering mounting plate, operationally connected to a bottom face of said dynamic moiety.

* * * * *